US012159547B2

(12) United States Patent
Nagonda et al.

(10) Patent No.: US 12,159,547 B2
(45) Date of Patent: Dec. 3, 2024

(54) GROUND-BASED SYSTEM AND METHOD FOR AUTONOMOUS RUNWAY OVERRUN PREDICTION, PREVENTION AND MONITORING

(71) Applicant: Rockwell Collins, Inc., Cedar Rapids, IA (US)

(72) Inventors: Ajay Nagarajan Nagonda, Madurai (IN); Subramanian Ramasamy, Bangalore (IN); Karthik Neelatur Manjunath, Bangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 220 days.

(21) Appl. No.: 17/979,619

(22) Filed: Nov. 2, 2022

(65) Prior Publication Data

US 2023/0386352 A1 Nov. 30, 2023

(30) Foreign Application Priority Data

May 24, 2022 (IN) ............................ 202241029763

(51) Int. Cl.
*G08G 5/02* (2006.01)
*G08G 5/00* (2006.01)
*G08G 5/04* (2006.01)

(52) U.S. Cl.
CPC ........... *G08G 5/025* (2013.01); *G08G 5/0013* (2013.01); *G08G 5/0039* (2013.01); *G08G 5/0091* (2013.01); *G08G 5/045* (2013.01)

(58) Field of Classification Search
CPC .... G08G 5/025; G08G 5/0013; G08G 5/0039; G08G 5/0091; G08G 5/045
See application file for complete search history.

(56) References Cited

U.S. PATENT DOCUMENTS

| | | | |
|---|---|---|---|
| 10,059,466 | B2 | 8/2018 | DeGagne et al. |
| 10,214,300 | B2 | 2/2019 | Feyereisen et al. |
| 11,282,400 | B2 | 3/2022 | Byxbe et al. |

(Continued)

OTHER PUBLICATIONS

ATSB, "Transport safety report", https://skybrary.aero/sites/default/files/bookshelf/665.pdf, accessed Nov. 2021.

(Continued)

*Primary Examiner* — Mathew Franklin Gordon
(74) *Attorney, Agent, or Firm* — Suiter Swantz IP

(57) ABSTRACT

A ground-based system for autonomous runway excursion prevention and monitoring stores runway datasets for each runway (or each directional orientation of a runway), each dataset including 1) lengths of the runway's stable/unstable touchdown regions (STR/UTR), the STR defined by a runway aiming point and by touchdown zone markings on either side (and the UTR comprising the remainder of the runway) and 2) an ideal glide slope associated with a stable approach path to the runway by a particular aircraft and a touchdown within the STR, the ideal glide slope and STR defining a stable approach channel (SAC). The system constructs a trajectory based on position reports from each approaching aircraft and, if the aircraft sufficiently deviates from the SAC and the remaining runway length after predicted touchdown is consistent with a likely runway overrun (RO), generates course corrections for the flight crew to resolve the unstable approach path.

16 Claims, 6 Drawing Sheets

(56) References Cited

U.S. PATENT DOCUMENTS

| | | | |
|---|---|---|---|
| 2001/0052562 A1 | 12/2001 | Ishihara et al. |
| 2014/0257601 A1 | 9/2014 | Horne et al. |
| 2015/0302753 A1 | 10/2015 | Henderson |
| 2017/0032683 A1 | 2/2017 | Meserole, Jr. et al. |
| 2022/0028281 A1 | 1/2022 | Byxbe et al. |

OTHER PUBLICATIONS

Costea, et al., "Trajectory estimation for transportation systems: Aircraft tracking applications," 2015 38th International Spring Seminar on Electronics Technology(ISSE), 2015, pp. 329-332, doi: 10.1109/ISSE.2015.7248016.

Esenbuğa, et al., (2016). Comparison of Principal Geodetic Distance Calculation Methods for Automated Province Assignment in Turkey.10.5593/SGEM2016/22/S09.019.

Federal Aviation Administration, "Runway Excursions: an ATC Perspective on Unstable Approaches", https://runwayexcursions.faa.gov/content.html?id=c, accessed Nov. 2021.

Flight Safety Foundation, "Global Action Plan for the Prevention of Runway Excursions", https://flightsafety.org/toolkits-resources/gappre/, accessed Nov. 2021.

Ha, et al., Design of Glide Slope Capture Logic Using Model Inversion, International Conference on Control, Automatics and System, 2001.

IATA, "Runway safety accident report analysis", https://www.iata.org/contentassets/7a5cd514de9c4c63ba0a7ac21547477a/rsar-1st-2015-finalversion.pdf, accessed Nov. 2021.

IATA, "Unstable approach: Risk mitigation policies, procedures and best practices 2nd edition", https://www.iata.org/whatwedo/safety/runway-safety/Documents/unstable-approaches-2016-2ndedition.pdf, accessed Nov. 2021.

ICAO Annex 14—Aerodromes, Chapter 5. Visual Aids for Navigation, https://www.icao.int/APAC/Meetings/2015%20WAWG1/an14_1ed_1951.pdf.

ICAO, "MID-RRSS-Runway Excursion Statistics", https://www.icao.int/MID/Documents/2014/MIDRRSS-2/S3%20P1%20Runway%20Excursion%20Statistics.pdf, accessed Nov. 2021.

ICAO, "The New Global Reporting Format for Runway Surface Conditions," https://www.icao.int/safety/Pages/GRF.aspx, accessed Nov. 2021.

Jackson, et al., "Runway detection in High Resolution remote sensing data," 2015 9th International Symposium on Image and Signal Processing and Analysis(ISPA), 2015, pp. 170-175, doi: 10.1109/ISPA.2015.7306053.

Jacob, Armand, et al., Airbus, Safety First magazine, "https://safetyfirst.airbus.com/app/themes/mh_newsdesk/documents/archives/the-runwayoverrun-prevention-system.pdf" issue 8, accessed Nov. 2021.

Ju, et al., Longitudinal Auto-landing Controller Design via Adaptive Backstepping, Int. j. Adapt. Control signal process, 22 (2008), pp. 640-666.

Lee, et al., "A mathematical framework for asynchronous, distributed, decision-making systems with semi-autonomous entities: algorithm synthesis, simulation, andevaluation," Proceedings. Fourth International Symposium on Autonomous Decentralized Systems.—Integration of Heterogeneous Systems-, 1999, pp. 206-212, doi: 10.1109/ISADS.1999.838435.

Lungu, et al., "Estimation of aircraft state during landing by means of multiple observers," 2016 International Conference on Systems, Signals and Image Processing (IWSSIP), 2016, pp. 1-4, doi: 10.1109/IWSSIP.2016.7502761.

Pallotta et al., "Accurate Delay Estimation for Multi-Sensor Passive Locating Systems Exploiting the Cross-Correlation between Signals Cross-Correlations," in IEEE Transactions on Aerospace and Electronic Systems, doi: 10.1109/TAES.2021.3116927.

Qian, et al., "An improved aircraft landing distance prediction model based on particle swarm optimization—Extreme earning machine method," 2017 IEEEInternational Conference on Industrial Engineering and Engineering Management (IEEM), 2017, pp. 2326-2330, doi: 10.1109/IEEM.2017.8290307.

Singh, et al., "Real-time Unstable Approach Detection Using Sparse Variational Gaussian Process," 2020 International Conference on Artificial Intelligence and Data Analytics for Air Transportation (AIDA-AT), 2020, pp. 1-10, doi: 10.1109/AIDA-AT48540.2020.9049174.

Ugnenko, et al., (2017). Improvement of the Mathematical Model for Determining the Length of the Runway at the Stage of Aircraft Landing. Procedia Engineering. 187. 733-741. 10.1016/j.proeng.2017.04.448.

Zhang, et al., "Airport Detection on Optical Satellite Images Using Deep Convolutional Neural Networks," in IEEE Geoscience and Remote Sensing Letters, vol. 14, No. 8, pp. 1183-1187, Aug. 2017, doi: 10.1109/LGRS.2017.2673118.

Zhuang et al., "Real time runway detection in satellite images using multi-channel PCNN," 2014 9th IEEE Conference on Industrial Electronics and Applications, 2014, pp. 253-257, doi:10.1109/ICIEA.2014.6931168.

Extended European Search Report dated Nov. 6, 2023; European Application No. 23175199.1.

GROUND-BASED SYSTEM AND METHOD FOR AUTONOMOUS RUNWAY OVERRUN PREDICTION, PREVENTION AND MONITORING

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

Related Applications

Indian Provisional Patent Application No. 202241029763 filed May 24, 2022 relating to GROUND-BASED SYSTEM AND METHOD FOR AUTONOMOUS RUNWAY OVERRUN PREDICTION, PREVENTION AND MONITORING.

Said Indian Provisional Patent Application No. 202241029763 is herein incorporated by reference in its entirety.

BACKGROUND

The Civil Air Navigation Services Organization (CANSO) defines runway excursion (RE) as an event in which an aircraft veers off or overruns the runway surface during either take-off or landing. RE is a common cause of aviation accidents generally (23% of all accidents tracked globally between 2009 and 2013) and thus may contribute to life-threatening accidents. Similarly, runway overrun (RO) is an event where the aircraft is unable to complete its landing rollout or takeoff phase within the limits of the runway stretch. A RO can occur due to various factors such as unstable approach, incorrect utilization of a runway touchdown zone, insufficient manual braking (e.g., post-touchdown), runway contamination with water or snow, extended flare, abnormal tailwind, and/or delayed utilization of reverse thrusters, etc. Of these contributing factors, according to the International Air Transport Association (IATA) unstable approach dominates as a contributor to RO.

Air traffic controllers on the ground can identify and report an unstable approach to flight crew, but abnormalities in approach related stability parameters (e.g., glideslope angle, heading, airspeed, sink rate, thrust) may be more quickly determined by the flight crew. Further, it is ultimately the flight crew who must initiate transition from an unstable to a stable approach to reduce the likelihood of RO. However, IATA has found that 97% of flight crew failed to transition from an unstable approach into a go-around, resulting in longer runway occupancy times (ROT) and increasing the chance of RO. IATA concluded that the flight crew's urge to get to the ground as quickly as possible, along with untimely and unexpected instructions from air traffic controllers, contributed to the crew's reluctance to go around and continue an unstable approach to landing. Accordingly, it may be desirable to provide air traffic controllers with the means to offer timely guidance to the flight crew, so that the flight crew may in turn take timely corrective action where needed to prevent an unstable approach from developing into RO/RE. Conventional approaches to preventing RO/RE may determine a likelihood of RO/RE, and an alert if RO/RE is imminent, but do not offer corrective action.

SUMMARY

In a first aspect, a ground-based system for autonomous runway excursion prediction, prevention and monitoring is disclosed. In embodiments, the system stores a runway dataset for each runway, e.g., at an airport or group of airports. Each runway dataset includes the lengths of the runway's stable and unstable touchdown regions (STR/UTR), the STR defined by the runway aiming point and touchdown zone markers on either side thereof and the UTR comprising the remainder of the runway forward of the STR. Each runway dataset further includes an ideal glide slope trajectory associated with a stable approach path (SAP) to the runway, and a touchdown at the aiming point, by a given aircraft. The STR, SAP, and glide slope together define a three-dimensional stable approach channel (SAC) consistent with a touchdown within the STR and sufficient runway for rollout and/or deceleration. The system includes a communications device for receiving position reports from each aircraft on approach to the runway. The system includes processors in communication with the memory and communications device. The system constructs for each aircraft on approach, based on the received position reports, an approach trajectory and predicted touchdown point. The system correlates the approach trajectory with the SAP to determine the deviation, if any, of the aircraft from the SAC. If the deviation meets or exceeds threshold levels, the system determines the remaining runway available to the aircraft based on its current unstable approach path and likely touchdown point. If the runway length required by the aircraft for rollout and/or deceleration on its current approach path exceeds the available runway length, the system declares the aircraft to be on an unstable approach path. If an unstable approach path is declared, the system generates course corrections configured for reconciling the aircraft trajectory with the SAC, and forwarding the course corrections to air traffic control for timely relay to the flight crew.

In some embodiments, if the required runway length (RRL) for an aircraft on an unstable approach path exceeds the available runway length, the system initiates a delay for flight crew to resolve the unstable approach path on their own, generating course corrections if on expiration of the delay the deviation of the approach trajectory continues to meet or exceed threshold levels and RRL continues to exceed available runway length.

In some embodiments, the system automatically generates and forwards course corrections if the aircraft on approach is at or below a decision altitude.

In some embodiments, if the approach trajectory continues to sufficiently deviate from SAC such that reconciliation of the unstable approach path is no longer possible, the system issues a go-around recommendation to air traffic controllers.

In some embodiments, the received position reports are Automatic Dependent Surveillance-Broadcast (ADS-B) Out messages.

In some embodiments, the system constructs the approach trajectory based on two or more successive or sequential ADS-B Out messages.

In some embodiments, the system includes runway sensors for sensing moisture, precipitation, or other environmental conditions on the runway that may affect required runway length. Environmental conditions (e.g., and their effect on landing speed and/or braking deceleration) are accounted for when calculating RRL for an aircraft on an unstable approach path.

In some embodiments, environmental conditions include runway friction status and/or contamination status (e.g., functions of the wetness or dryness of the runway).

In some embodiments, the system stores multiple runway datasets, each dataset based on a different runway.

In some embodiments, the system stores multiple runway datasets based on runway orientations. For example, a given runway may include two opposing orientations (e.g., based on a landing in one of two opposing directions).

In a further aspect, a method for runway overrun/runway excursion (RO/RE) prediction, monitoring, and prevention is also disclosed. In embodiments, the method includes storing to memory a runway dataset for a runway, each runway dataset including 1) a length of a stable and unstable touchdown region (STR/UTR), the STR defined by the runway aiming point and by touchdown zone markers on either side thereof and the UTR comprising the remainder of the runway forward of the STR; and 2) an ideal glide slope trajectory associated with a stable approach path (SAP) to the runway, and a touchdown at the aiming point, by a given aircraft. The method includes defining, based on the SAP, a three-dimensional stable approach channel (SAC) corresponding to a touchdown within the STR. The method includes receiving at least one aircraft on an approach to land on the runway. The method includes determining, based on two or more sequential position reports received from each aircraft, an approach trajectory and predicted touchdown point on the runway. The method includes determining a deviation of the approach trajectory from the SAC by correlating the approach trajectory and the SAP. The method includes, if the deviation of the approach trajectory meets or exceeds threshold levels, calculating a required runway length (RRL) of the aircraft based on a predicted touchdown point in the UTR. The method includes, if the RRL exceeds available runway length, declaring an unstable approach path. The method includes, if an unstable approach path is declared, generating course corrections for reconciling the unstable approach path with the stable approach channel (and, e.g., a touchdown within the STR). The method includes forwarding the course corrections to the flight crew via air traffic controllers in communication therewith.

In some embodiments, the method includes initiating a delay period for the flight crew to resolve the unstable approach path on their own and, if on expiration of the delay period the deviation of the approach trajectory from the SAC continues to meet or exceed the unstable approach path threshold and the RRL continues to exceed the ARL, generating course corrections for the flight crew.

In some embodiments, the method includes automatically generating the course corrections for the flight crew (e.g., without a delay period) if the aircraft is below a decision altitude.

In some embodiments, the method includes forwarding a go-around recommendation to the flight crew via the air traffic controllers (e.g., if resolving the unstable approach path is no longer feasible).

In some embodiments, the method includes determining an approach trajectory and predicted touchdown point based on a sequence of ADS-B Out messages transmitted by the aircraft, each ADS-B Out message uniquely identifying the aircraft and including a precise latitude, longitude, and altitude.

In some embodiments, the method includes calculating required runway length (e.g., a landing speed and/or braking deceleration of the aircraft) based on runway environmental data collected by runway sensors or forwarded by airport meteorologists.

In some embodiments, the environmental data includes runway friction status or runway contamination status (e.g., a wetness or dryness of the runway based on precipitation, humidity, or other moisture detected on or around the runway).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
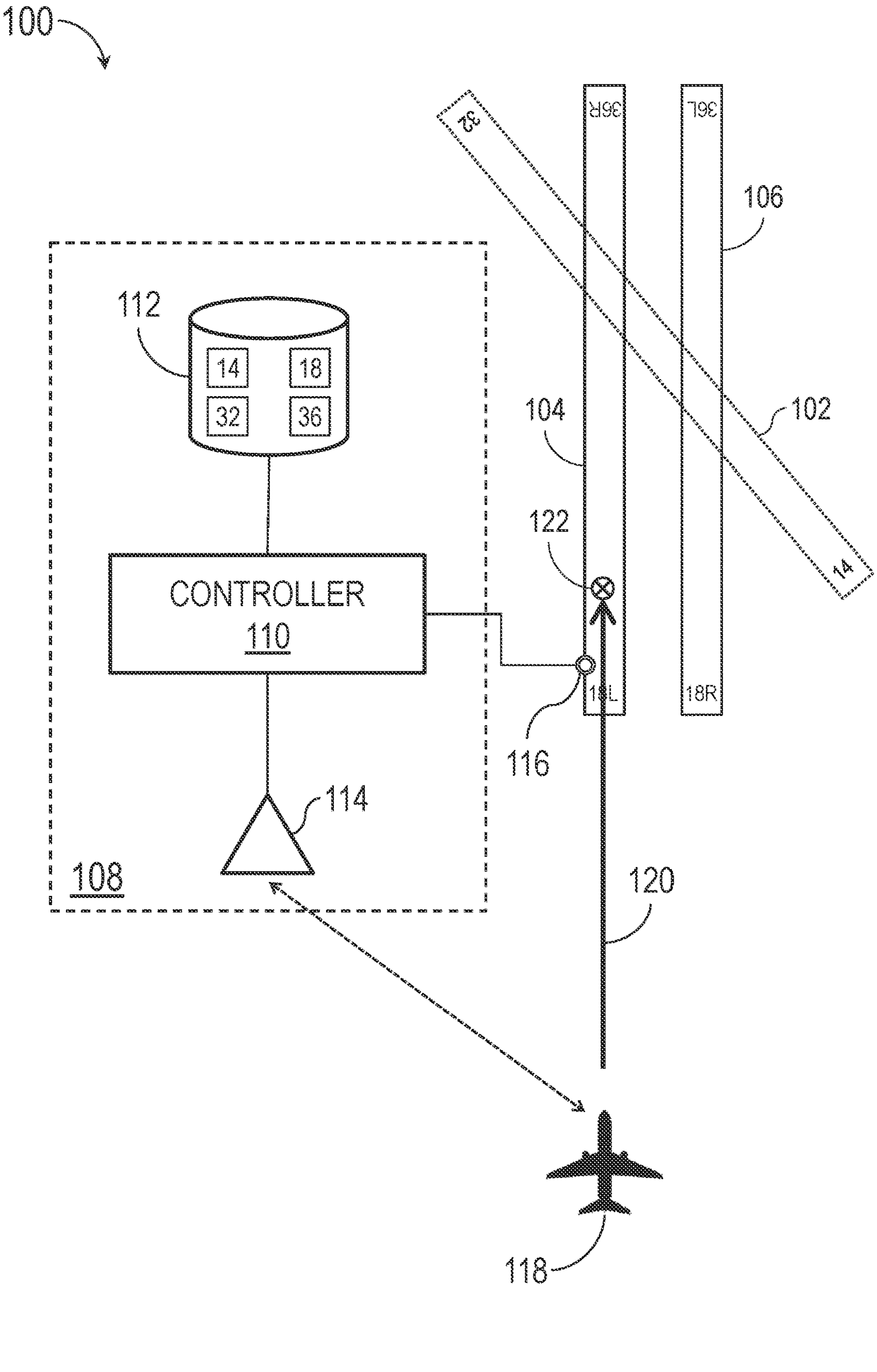
FIG. 1 is a diagrammatic illustration of an airport runway and a ground-based system for autonomous runway overrun/runway excursion (RO/RE) prevention and monitoring according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, an airport 100 is shown. The airport 100 may include runways 102, 104, 106 and air traffic control (ATC) station 108 comprising controller 110, runway database 112, communications system 114, and runway sensor 116.

Broadly speaking, embodiments of the inventive concepts disclosed herein are directed to a ground-based system and method for detecting an unstable approach of an aircraft on approach to a landing at the runway, where the unstable approach may develop into a runway excursion (RE) or runway overrun (RO) if not corrected, and determining the extent to which the unstable approach deviates from a stable approach. Air traffic controllers on the ground will be provided with the means to notify flight crew on a timely basis not only that their approach is unstable, but the corrective actions needed to restore a stable approach as soon as possible. If the unstable approach continues to deviate from a stable approach, e.g., if the instability is not corrected and in fact worsens to the extent that corrective action may not restore the stable approach, controllers may instead advise the flight crew to go around for a stable and safer re-approach.

In embodiments, the airport 100 may incorporate a single runway 102 or multiple runways 102, 104, 106. For example, each runway 102 may have a designation of its orientation, e.g., "14" or "one-four" for a runway oriented at a heading of substantially 140 degrees (e.g., rounded to the nearest 10 degrees), where due north is 0/360 degrees and due south is 180 degrees. Accordingly, an aircraft 118 on approach to runway 14 would navigate to a heading of 140 degrees. Similarly, the runway 102 may simultaneously have two designations, e.g., "14" for air traffic approaching and landing at a heading of 140 degrees, and "32"/"three-two" for air traffic approaching and landing in the opposite direction, e.g., 320 degrees. In some embodiments, the airport 100 may incorporate parallel runways 104 (18L, or "one-eight-left"/36R, "three-six-right") and 106 (18R/"one-eight-right" and 36L "three-six-left).

In embodiments, the communications system 114 may be responsible for all communications between the ATC ground station 108 and each aircraft 118 landing at (or departing from) the airport 100. For example, air traffic controllers may communicate directly with the flight crew of the aircraft 118 via voice communications at an assigned frequency. Further, the communications system 114 may include a surveillance radar system for managing and controlling all air traffic in the vicinity of the airport 100. For example, the communications system 114 may receive Automatic Dependent Surveillance-Broadcast (ADS-B) Out messages from the aircraft 100. ADS-B Out messages are periodic and automatic determination and transmission of the aircraft's current position (e.g., latitude, longitude, altitude). ADS-B Out messages allow the ATC ground station 108 to monitor the trajectory of the aircraft 118 whether it is taking off from, landing at, or merely passing through the airspace surrounding the airport 100. In this way, air traffic controllers can maintain safe separation between the aircraft 118 and any other obstacles, including other proximate air traffic also reporting position information via ADS-B Out (or other like means of surveillance radar).

In embodiments, the ATC ground station 108 may maintain a runway database 112 comprising detailed information specific to each runway 102, 104, 106 and/or orientation thereof. For example, the runway database 112 may include, for each individual runway 102, 104, 106 (including, to the extent that they are distinct from each other, each opposing directional orientation (e.g., 14/32, 18L/36R) of a particular runway) a runway dataset comprising: total runway length; size and relative position of the runway threshold; distance of an ideal runway aiming point from the runway threshold; sizes and positions of runway markings; and ideal glideslope trajectory for the runway. Ideal glideslope trajectory may be determined from (and may be later revised by) from historical flight data associated with stable approaches and landings; similarly, ideal glideslope trajectory may vary depending on the type of aircraft.

In embodiments, the controller 110 may establish contact (e.g., via the communications system 114) with each aircraft 118 on an approach trajectory 120 to a landing on a runway 104 of the airport 100. For example, the aircraft 118 may be handed over to the air traffic controllers from an adjacent or proximate air traffic control facility, e.g., when the aircraft enters the airspace controlled by the ATC ground station 108. In embodiments, based on the specific landing characteristics of the runway 104 as stored by the runway database, the controller 110 may continually assess the approach trajectory 120 of the aircraft 118 to determine if the approach trajectory is consistent with a stable approach to the runway 104. For example, a stable approach may be characterized as an approach leading to a runway aiming point 122 that provides an optimal runway length for safe braking, deceleration, and rollout by the aircraft 118 after touchdown on the runway 104. Based on continuous position reports of the aircraft 118 (e.g., ADS-B Out messages) as received by the communications system 114, the controller 110 may project the approach trajectory 120 and correlate the projected approach with an ideal stable approach channel (SAC; stable approach path (SAP)). If, for example, the controller 110 determines that the approach trajectory 120 is currently unstable, or sufficiently deviates from the ideal SAC/SAP, the controller 110 may suggest specific corrective actions to remedy the unstable approach trajectory. Air traffic controllers may pass these corrective actions to the flight crew (e.g., via the communications system 114) or wait for the flight crew to take corrective action of their own. If the approach trajectory 120 continues to deviate from the SAC/SAP, or deviates to the point that corrective action can no longer resolve the unstable approach, the controller 110 may advise air traffic controllers to recommend the flight crew go around for another approach. In some embodiments, the controller 110 may independently monitor stable approaches for multiple runways 102, 104, 106 (or, e.g., both directional orientations of a given runway) at the airport 100.

In embodiments, each runway 102, 104, 106 may incorporate one or more runway sensors 116. For example, runway sensors 116 may measure precipitation, runway contamination, or other environmental factors that may affect the safe landing of the aircraft 118 on the runway 104. Contamination or precipitation on the runway 104, for example, alters the friction coefficient of the runway and lengthens the amount of runway required for safe braking and rollout once the aircraft 118 has touched down, which may in turn affect the extent to which an unstable approach can be corrected or should be aborted.

Figure 2:
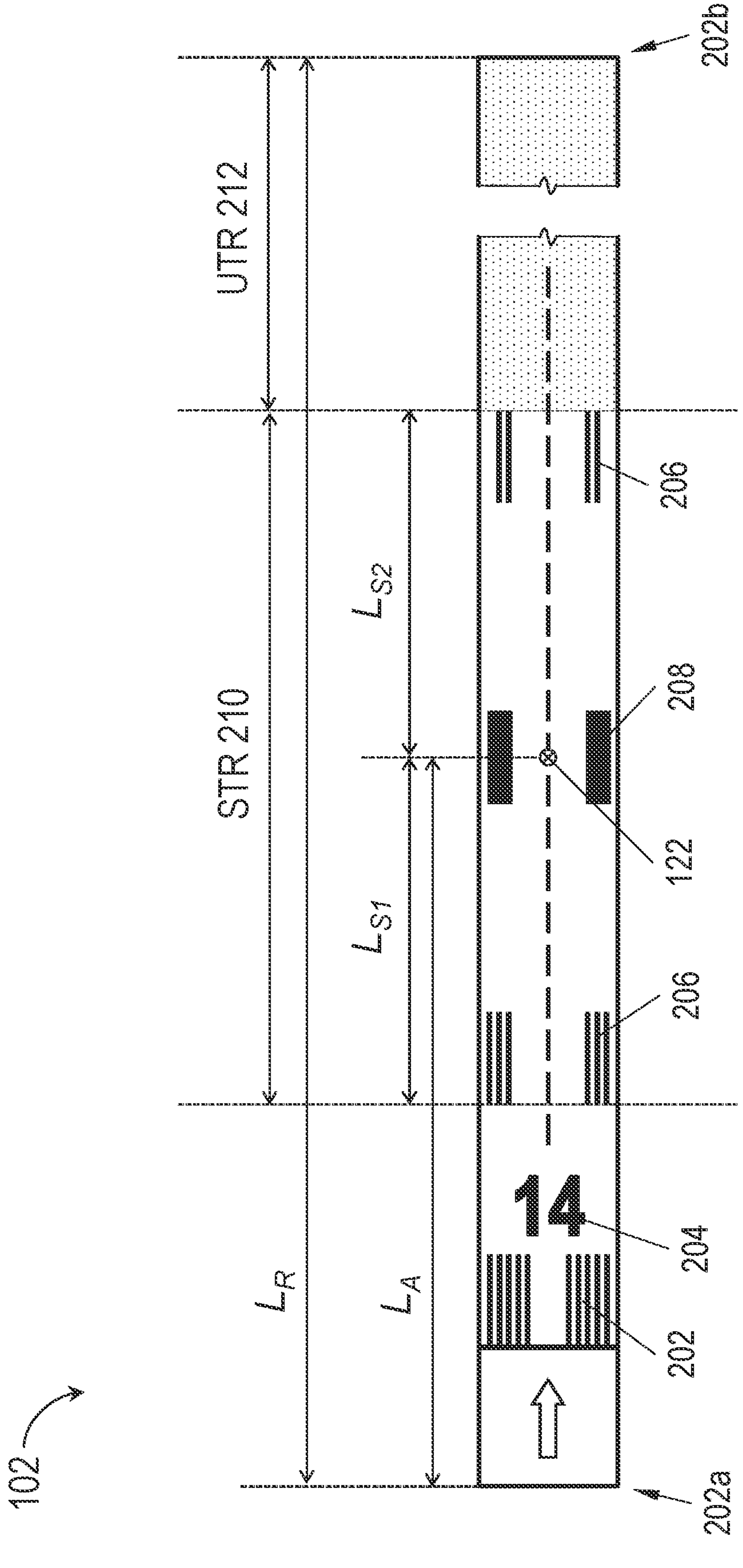
FIG. 2 is an overhead diagrammatic illustration of an airport runway monitored by the system of FIG. 1.

Referring now to FIG. 2, the runway 102 is shown.

In embodiments, the runway 102 may be marked to facilitate visual determination of an optimal touchdown point by the flight crew of the aircraft (100, FIG. 1) on an approach trajectory (120, FIG. 1). For example, the runway 102 may include a runway threshold marker 202, e.g., identifying the beginning of the portion of the runway available for landing under non-emergency conditions; the runway threshold marker may be located forward of the actual runway threshold 202*a* (e.g., the runway edge). Similarly, the runway 102 may include a runway designation 204 identifying the runway (e.g., "14", "18L"). In embodiments, runway touchdown zone markings 206 may define a touchdown zone within the runway 102 and may additionally provide distance information (e.g., via markers spaced 500 ft/150 m apart). Further, runway aiming point markings 208 may provide an ideal aiming point 122 for touchdown on the runway 102, at a distance LA (e.g., 1,000 ft/300 m) from the runway threshold 202*a*.

In some embodiments, the controller (110, FIG. 1) may control a ground-based system monitoring multiple runways, e.g., at multiple locations. For example, runway parameters specific to a given runway 102 and stored to the runway database (112, FIG. 1) may be determined based on latitude and longitude data corresponding to the location of the runway and/or its component zones and markings. Further, remote sensing and/or neural networks (e.g., pulse coupled neural networks (PCNN), convolutional neural networks (CNN)) may extract precision position information corresponding to the runway 102 and/or its components from satellite imagery of the runway.

In embodiments, the controller 110 may associate each runway 102 with a stable touchdown region 210 (STR) and an unstable touchdown region 212 (UTR). For example, the runway 102 may be associated with a total runway length $L_R$ and a runway aiming point 122 at a distance $L_A$ from the runway threshold 202*a*. In embodiments, the STR 210 may be bounded by a distance $L_{S1}$, $L_{S2}$ on either side of the runway aiming point 122, extending to the edges of the adjacent touchdown zone markings 206 on either side of the aiming point markings 208. Accordingly, the UTR 212 may comprise that portion of the runway 102 forward of the STR 210, e.g., extending from the forward edge of the touchdown zone marking 206 directly forward of the aiming point markings 208 to the far runway threshold 202*b*, such that the STR may have a length $L_{S1}+L_{S2}$ and the UTR may have a length $L_R-(L_{S1}+L_A)$. In embodiments, the above dimensions and markings corresponding to the runway 102, including the lengths of the STR 210 and UTR 212, may be stored to the runway database 112.

Figure 3:
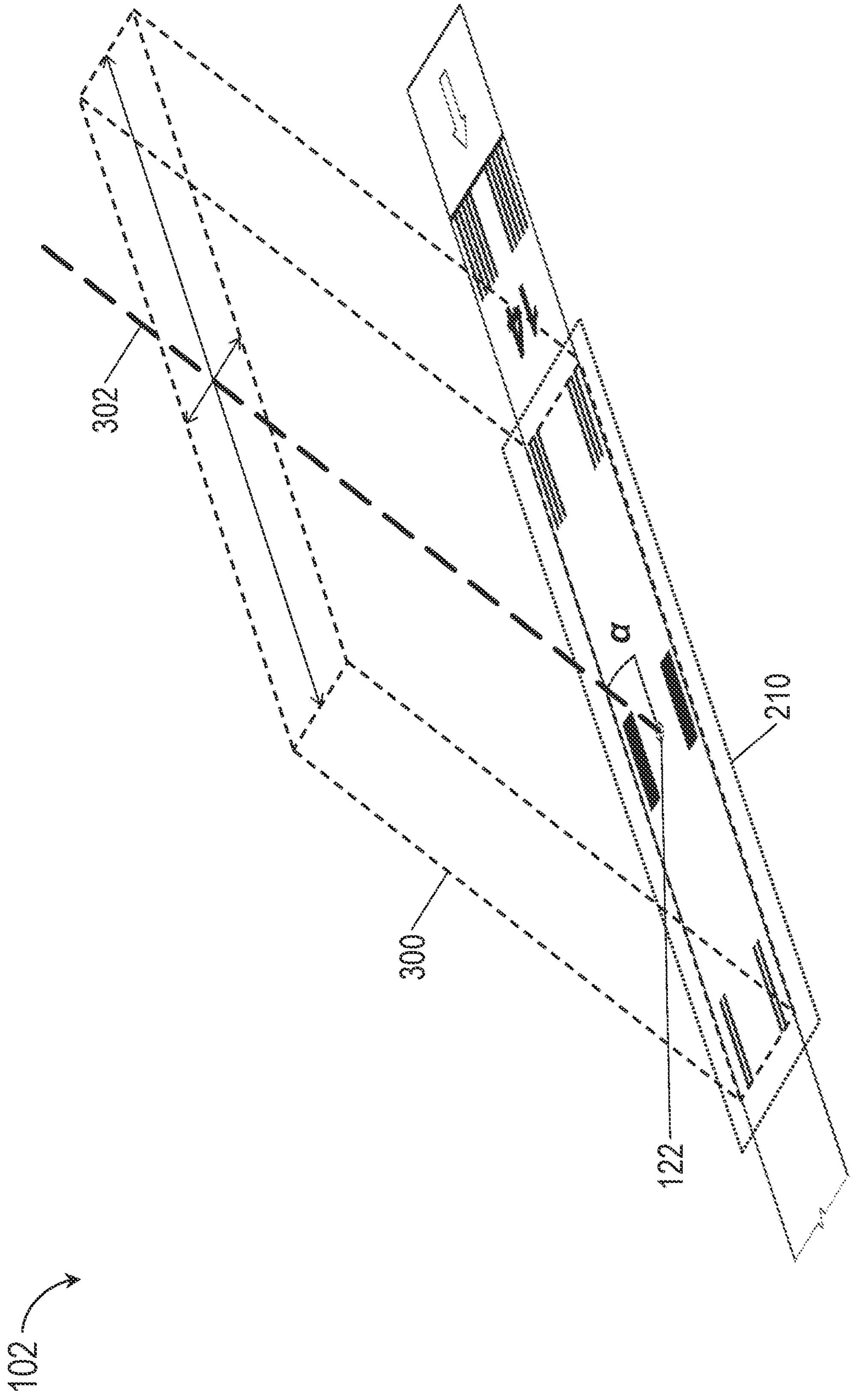
FIG. 3 is a three-dimensional isometric view of the runway of FIG. 2, illustrating autonomous runway monitoring operations of the system of FIG. 1.

Referring also to FIG. 3, a stable approach channel 300 (SAC) may be defined by the controller 110 based on the STR 210. In embodiments, an ideal glideslope trajectory 302 at an angle $\alpha$ to the runway 102 (e.g., specific to the runway 102 and/or to the specific aircraft 100 currently on approach trajectory 120) may be projected onto the runway aiming point 122. Further, a three-dimensional SAC 300 may be projected in line with the STR 210 and parallel to the ideal glideslope trajectory 302. For example, the SAC 300 may define acceptable deviations $\Delta\sigma$ from the ideal glideslope trajectory 302, e.g., the extent to which the approach trajectory 120 may deviate from the ideal glideslope trajectory while providing for a touchdown within the STR 210. In embodiments, in-air coordinates corresponding to the SAC 300 may likewise be stored to the runway database 112.

Figure 4:
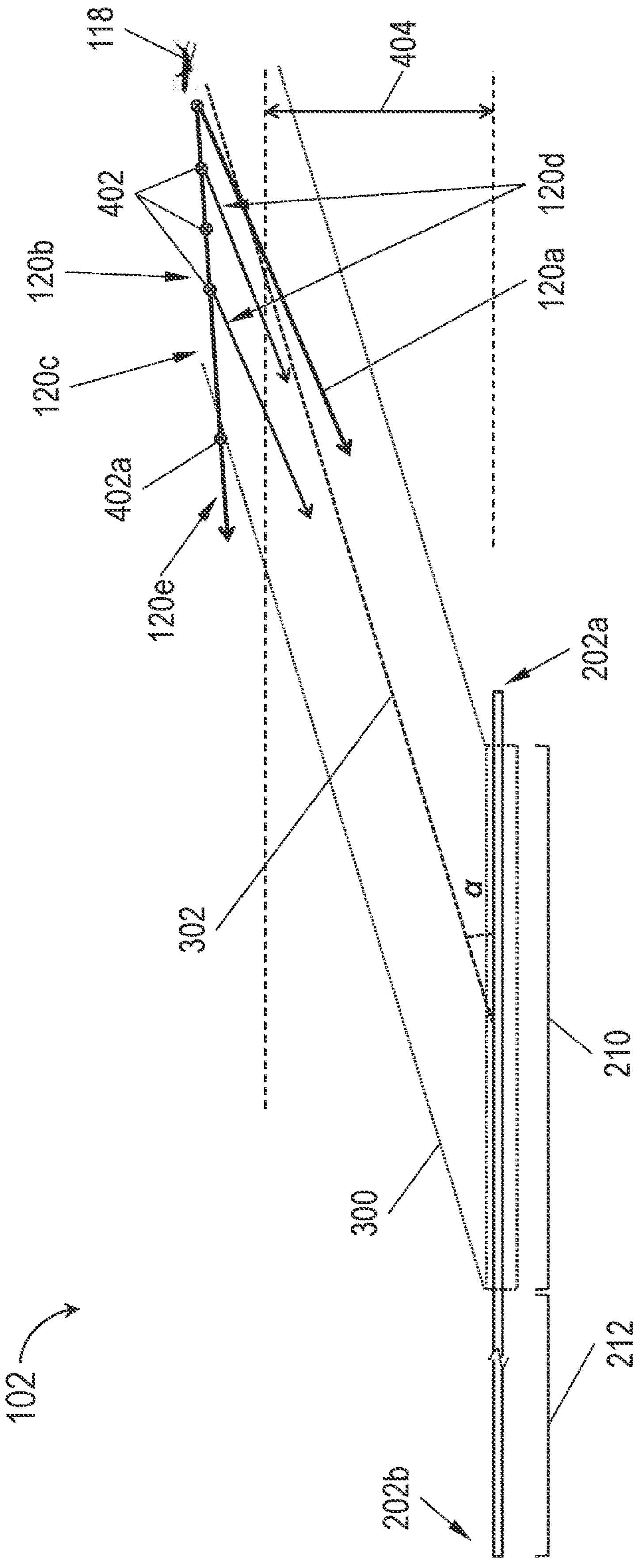
FIG. 4 is a profile view of the runway of FIG. 2, illustrating autonomous runway monitoring operations of the system of FIG. 1.

Referring now to FIG. 4, the runway 102 is shown.

In embodiments, the controller (110, FIG. 1) may monitor the approach trajectory (120, FIG. 1) of the aircraft 118 based on position reports received from the aircraft, e.g., via the communications system (114, FIG. 1). For example, the aircraft 118 may generate and transmit ADS-B Out messages once per second (e.g., or more frequently, if demanded by the ATC ground station (108, FIG. 1)). Each ADS-B Out message may uniquely identify the aircraft 118 (e.g., via tail number/ICAO identifier) and provide a precise (e.g., Wide Area Augmentation System (WAAS) GPS-enabled) latitude, longitude, and altitude of the aircraft at a discrete timestamp 402.

In embodiments, the controller 110 may project the approach trajectory 120 of the aircraft 118 based on the sequence of received position reports, e.g., as a real valued function. The controller 110 may similarly convert the representation of the SAC 300 into a real-valued function and cross-correlate the approach trajectory 120 and SAC to determine real-time deviation $\sigma_e$ of the aircraft 118 from the ideal glideslope trajectory 302. For example, a positive correlation of the approach trajectory 120 and the ideal glideslope trajectory 302 may indicate that the aircraft 118 and its approach trajectory (120*a*) is within the bounds of the SAC 300, e.g., a real time deviation $\sigma_e$ within acceptable deviations $\Delta\sigma$ and a touchdown point within the STR 210. In embodiments, the controller 110 may continue to correlate the approach trajectory 120*a* and the ideal glideslope trajectory 302 to ensure that the aircraft 118 remains on a stable approach path to touchdown within the STR 210.

In embodiments, a negative correlation of the approach trajectory 120 and the ideal glideslope trajectory 302 may likewise indicate a potentially unstable approach path (120*b*), e.g., a real time deviation $\sigma_e$ outside acceptable deviations $\Delta\sigma$ and a touchdown point within the UTR 212. For example, even though the position of the aircraft 118 may be within the SAC 300, its approach trajectory 120 may lead the aircraft away from the ideal glideslope trajectory 302 and out of the SAC, to the point where touchdown inside the STR 210 (e.g., and safe landing, deceleration, and/or rollout within the runway 102) may be impossible.

In embodiments, if the controller 110 determines that the aircraft 118 is on a potentially unstable approach path 120*b*, the controller may determine specific corrective actions necessary for the aircraft to restore a stable approach path, and forward these corrective actions to air traffic controllers (e.g., at the ATC ground station 108) for transmission to the flight crew. For example, the controller 110 may first calculate required runway length (RRL), or the length of runway 102 required for the aircraft 118, on its current potentially unstable approach path **120*b*, to decelerate to a complete halt (or, alternatively, decelerate to taxiing speed) upon touchdown within the UTR 212. By comparing RRL with worst-case available runway length (ARL), the controller 110 may determine the likelihood of RO/RE based on the current potentially unstable approach path 120*b*. In embodiments, worst-case ARL may be defined as the length of the UTR 212, or the remainder of the runway 102 forward of the STR 210 (e.g., $L_R-(L_{S1}+L_A)$ and extending toward the far runway threshold 202*b***).

In embodiments, RRL may account for the landing speed $V_{Lnd}$ (e.g., in m/s) and average braking deceleration $j_B$ (e.g., in m/s²) of the aircraft 118, as well as any runway contamination detected by runway sensors (116, FIG. 1). For example:

$$RRL = \frac{(V_{Lnd})^2}{2j_B} \quad [1]$$

$$\text{where } V_{Lnd} = \sqrt{\frac{2mg}{C_{cpw}\rho a}} \quad [2]$$

$$\text{and } j_B = \frac{0.5\left[C_x\frac{\rho(V_{Lnd})^2}{2}a + (f_Z)(K_{rc})\left(mg - C\frac{\rho(V_{Lnd})^2}{2}a\right)\right]}{m} \quad [3]$$

where m is the mass, a is the wing area (e.g., in m²), $f_z$ is the friction coefficient, and $C_{cpw}$ is the maximum landing lift coefficient of the aircraft 118; $K_{rc}$ is the runway contamination coefficient of the runway 102 (e.g., as determined by/received from meteorological authorities at the airport 100 which may vary if the runway is dry or wet); g is gravitational acceleration (e.g., in m/s²); and ρ is air density (e.g., in kg/m³).

In embodiments, comparing RRL and worst-case ARL may result in the determination by the controller 110 of a positive state or a negative state, where a positive state is indicative at least a threshold probability of RO/RE (and thus an unstable approach path **120*c*) and a negative state is indicative of a likelihood of RO/RE that may be nonzero but as yet insufficient to indicate an unstable approach path). For example, if a preliminary positive state is determined, the controller 110 may decide (e.g., based on autonomous decision-making algorithms running on its processors) to compute corrective actions immediately, or to initiate a delay window for the flight crew to initiate manual correction of the unstable approach path 120*c* while continuing to monitor the unstable approach path. If, for example, the unstable approach path 120*c* is not sufficiently resolved when the delay window expires, the controller 110 may proceed to the computation of corrective actions (e.g., based on an updated unstable approach path). If a negative state is determined, the controller 110 may continue monitoring both the potentially unstable approach path 120*b*, as well as the RRL/worst-case ARL relationship, to determine if the computation of corrective action may yet be necessary. In some embodiments, the controller 110 may automatically compute corrective actions to resolve an unstable approach path 120*c* if the aircraft 118 is below a decision altitude 404** (e.g., at a radio altitude of 1,800 ft or less).

In embodiments, the controller 110 may compute corrective actions for air traffic controllers at the ATC ground station 108 to forward to the flight crew for resolution of the unstable approach path **120*c*. For example, the controller 110 may determine, based on a current or projected position of the aircraft 118 (e.g., corresponding to a timestamp 402) along the current potentially unstable approach path 120*b*), a sequence of adjustments to the pitch, altitude, and/or airspeed of the aircraft to safely transition the aircraft (e.g., within any applicable performance envelope) to a stable approach path 120*d* positively correlating with the ideal glideslope trajectory 302 and SAC 300, and consistent with a touchdown within the STR 210. In some embodiments, recommended corrective actions may restore a stable approach path 120*d* that, while consistent with a touchdown inside the STR 210, may prove for an RRL sufficiently under the worst-case ARL that the likelihood of RO/RE is zero or negligible. For example, the controller 110** may incorporate Lyapunov stability-based adaptive backstepping control schemes, dynamic model inversion control schemes, and other like algorithms for generating a controllable aircraft model in determining a sequence of corrective actions.

In some embodiments, if the aircraft 118 reaches a point (**402*a*) on the unstable approach path 120*c* where corrective action is no longer feasible, e.g., if flight crew have ignored or failed to implement previously forwarded corrective action sequences, the controller 110 may instead recommend the air traffic controllers issue a go-around recommendation to the aircraft 118, as the likelihood of RO/RE may be impossible to rule out given the current unstable approach path 120*e***.

By way of a non-limiting example, the aircraft 118 may initiate final approach at an on-ground distance of 10 km (~6.2 NM) from the runway threshold **202*a* and a radio altitude of 2,000 ft. The ideal glideslope trajectory 302 for the runway 102 may be set at α=3 degrees to the runway surface. As stored in the runway database (112, FIG. 1), the best-case ARL may be 2,200 m (~7,218 ft) and the worst-case ARL 1,870 m (~6,135 ft) for a touchdown inside the STR 210**.

The aircraft 118, for example, may be a widebody commercial jet associated with a stall speed of 102 knots (NM/h, ~189 km/h), a maximum landing weight of 365,000 lb (~165,561 kg), a wing area of 325.25 m², a maximum landing lift coefficient of 2.6, an approach lift drag ratio of 6.96:1, and a landing roll average coefficient of 0.8. Similarly, the runway 102 may be associated with a runway contamination coefficient $K_{rc}$ of 0.5 (dry)/0.2 (wet) and air density p may be assumed 1.224 kg/m³ (per sea level). Due to the effect of $K_{rc}$ on the runway friction coefficient fz, the aircraft 118 may be associated with an RRL of 629 m (~2,064 ft) for a dry runway and 1,411 m (~4,629 ft) for a wet runway. Accordingly, even under contaminated runway conditions a touchdown inside the STR 210 allows sufficient distance for a safe landing and rollout.

As noted above, for any touchdown inside the STR 210, the worst-case ARL may be 1,870 m. However, it follows that for any touchdown inside the UTR 212 (e.g., forward of the STR 210), the worst-case ARL will be less than 1,870 m. Accordingly, given a wet runway and a touchdown outside the STR 210, the aircraft 118 may have only a few hundred meters of spare runway at best for braking and rollout, emphasizing the importance of restoring a stable approach path **120*d*** as soon as possible to ensure a touchdown within the STR.

Figure 5A:
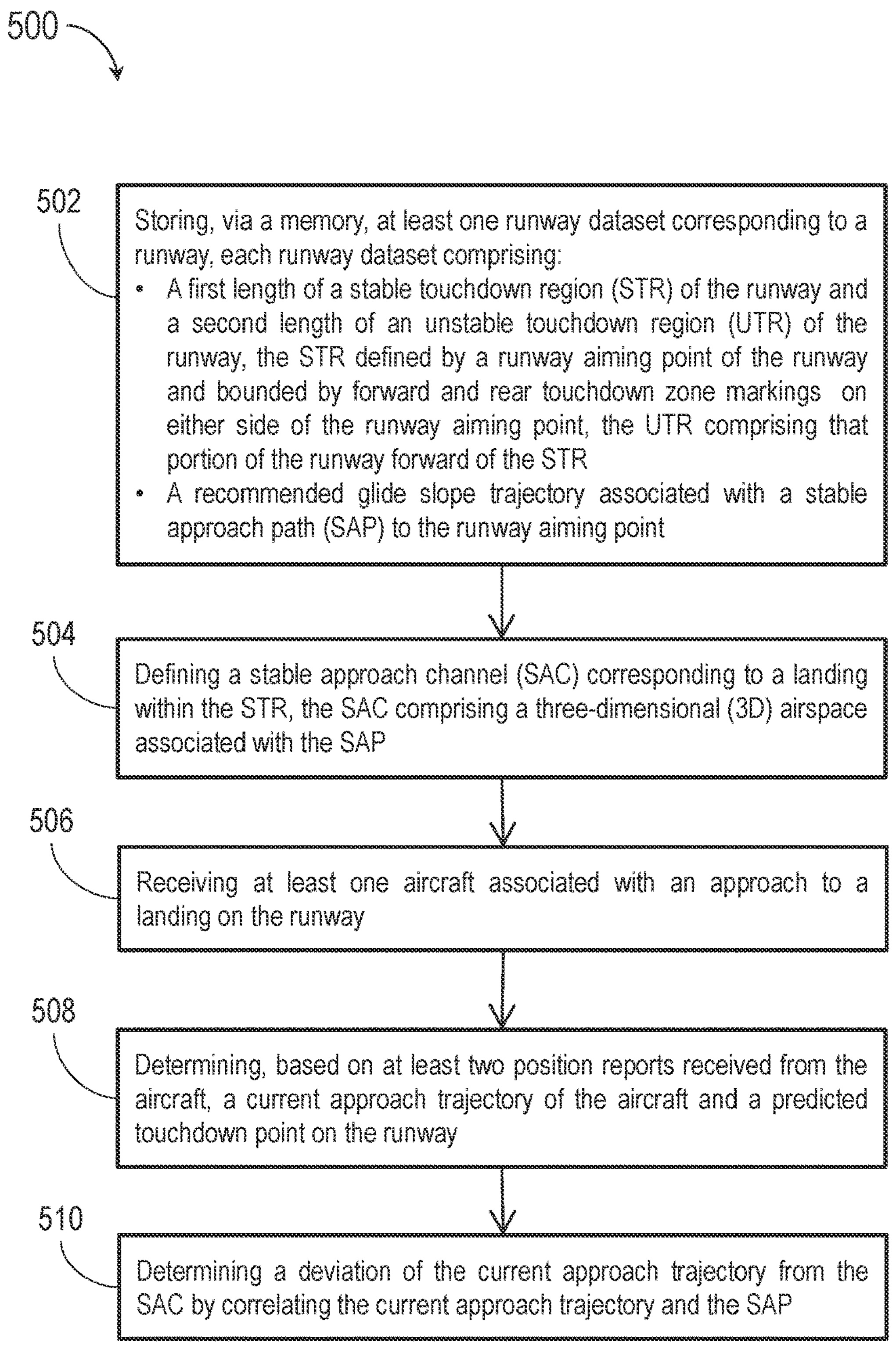
FIGS. 5A through 5C are flow diagrams illustrating a method for autonomous ground-based monitoring and RO/RE prevention according to example embodiments of this disclosure.

Referring now to FIG. 5A, the method 500 may be implemented by the controller 110 of the ground-based system and may incorporate the following steps.

At a step 502, a memory of the ground-based system stores runway datasets for each of a selection of runways (e.g., at a single airport or multiple airports; opposing directional orientations of a given runway), each runway dataset including a length of a stable touchdown region (STR) and an unstable touchdown region (UTR). For example, the STR is defined by a runway aiming point and bounded by the adjacent touchdown zone markers on either side, and the UTR includes that portion of the runway forward of the STR. The runway dataset also includes a recommended (e.g., ideal) glide slope trajectory providing for a stable approach path (SAP) to a touchdown at or near the runway aiming point within the STR.

At a step 504, the controller defines a three-dimensional stable approach channel (SAC) corresponding to the stable SAP and to a landing within the STR.

At a step 506, the controller (e.g., via airport-based communications systems) receives an aircraft on approach to a landing on the runway. For example, the controller will establish communications with the aircraft and receive ADS-B Out messages or like position reports therefrom.

At a step 508, based on at least two position reports received from the aircraft, the controller projects an approach trajectory of the aircraft toward a projected touchdown point on the runway. In some embodiments, the controller receives a sequence of ADS-B Out position reports from the aircraft on approach, and constructs the approach trajectory based on the sequence of reported positions extracted from the ADS-B Out position reports.

At a step 510, the controller determines a deviation of the approach trajectory from the SAC by cross-correlating the approach trajectory and the ideal glideslope trajectory/SAP.

Figure 5B:
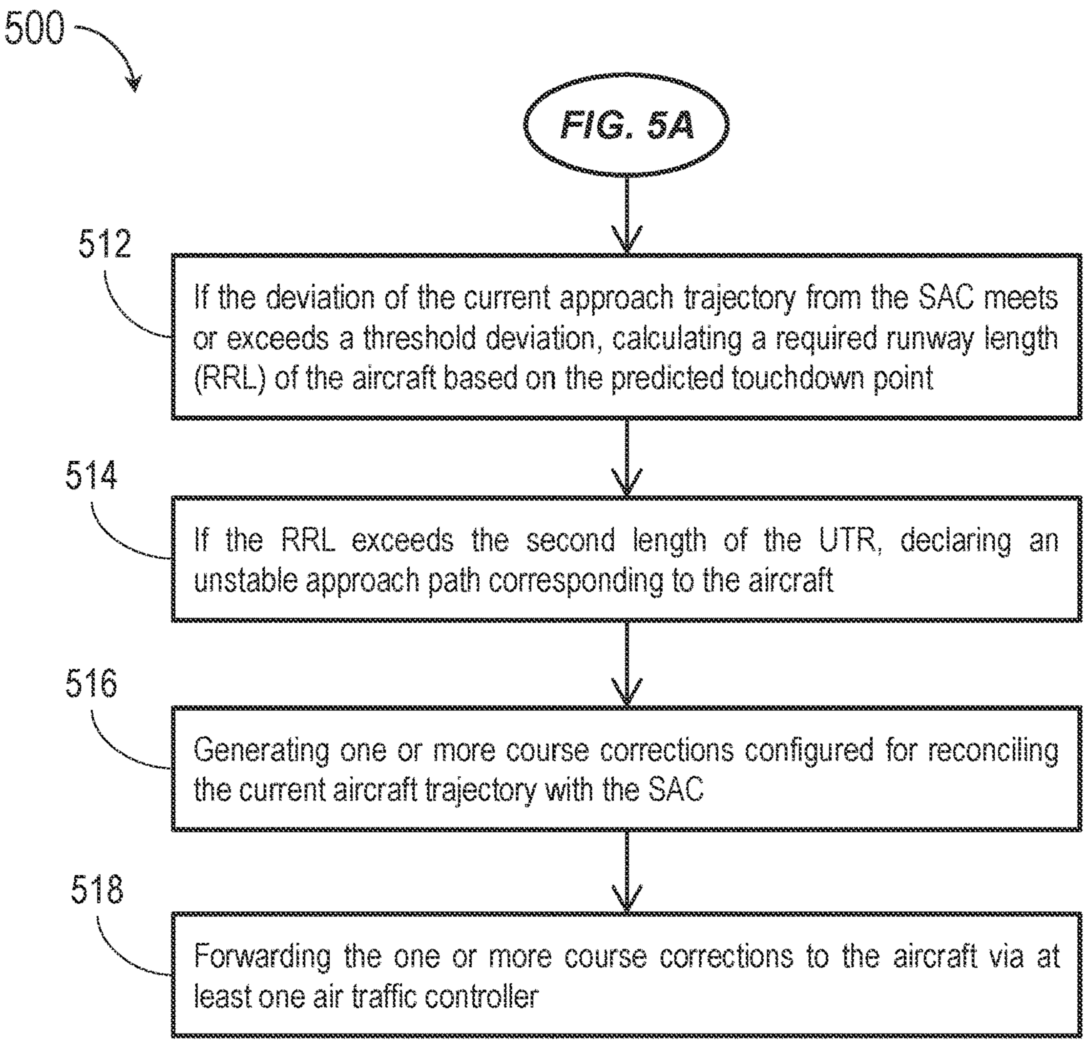

Referring also to FIG. 5B, at a step 512, if the deviation of the approach trajectory from the SAP/SAC meets or exceeds a threshold (e.g., consistent with a touchdown point beyond the STR), the controller calculates a required runway length (RRL) for the aircraft to decelerate or stop based on the projected touchdown point. For example, the controller may receive sensed environmental data (e.g., runway friction, runway contamination) relevant to a particular runway, which environmental data will inform the calculation of required runway length (e.g., along with landing speed, braking deceleration, and/or other characteristics particular to the aircraft).

At a step 514, if the RRL exceeds the available runway length (e.g., the available length of the UTR based on the projected touchdown point within the UTR), indicating a potential runway overrun/runway excursion (RO/RE), the controller declares the approach trajectory an unstable approach path.

At a step 516, when an unstable approach path is declared, the controller generates corrective actions (e.g., changes in pitch, airspeed, and/or altitude) for transitioning the aircraft to a stable approach path toward a touchdown point within the STR. In some embodiments, the controller may delay the generation of course corrections in order to allow the flight crew to independently resolve an unstable approach path; if the unstable approach path is not resolved on expiration of the delay period, the controller will proceed with generating course corrections. In some embodiments, the controller will immediately generate course corrections without initiating a delay, e.g., if the aircraft is at or below a decision altitude.

At the step 518, the controller forwards the recommended course corrections to the aircraft via air traffic controllers, e.g., at an air traffic control (ATC) ground station associated with the runway.

Figure 5C:
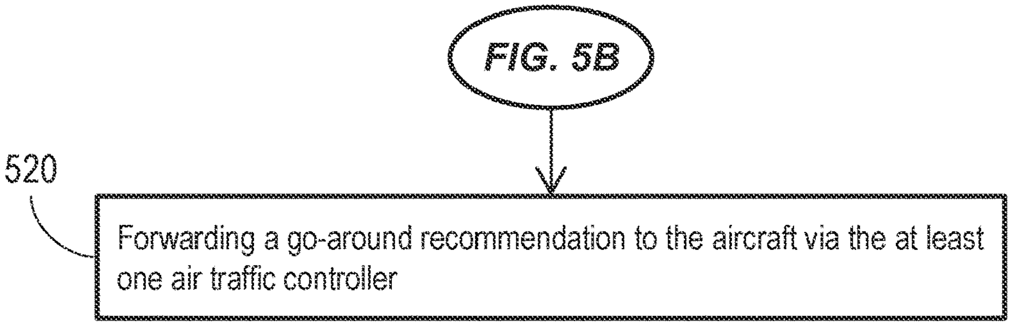

In some embodiments, the method 500 may include a further additional step 520. Referring also to FIG. 5C, at the step 520, if the flight crew has ignored prior forwarded course corrections such that corrective action to restore a stable approach path may no longer be feasible, the controller forwards a go-around recommendation to the aircraft via the air traffic controllers.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A ground-based system for autonomous runway excursion prevention and monitoring, the system comprising:

a memory configured for storing at least one runway dataset corresponding to a runway, each runway dataset comprising:

a first length of a stable touchdown region (STR) of the runway and a second length of an unstable touchdown region (UTR) of the runway, the STR defined by a runway aiming point of the runway and bounded by forward and rear touchdown zone markings on either side of the runway aiming point, the UTR comprising that portion of the runway forward of the STR;

and a recommended glide slope trajectory associated with a stable approach path (SAP) to the runway aiming point and with a stable approach channel (SAC) to a landing within the STR, the SAC comprising a three-dimensional (3D) airspace associated with the SAP;

a communications device configured to receive two or more position reports from at least one aircraft configured for an approach to a landing on the runway;

and at least one processor in communication with the memory and the communications device, the at least one processor configurable by processor-executable instructions stored to the memory for:

determining, based on the received two or more position reports, a current approach trajectory of the aircraft and a predicted touchdown point on the runway;

determining a deviation of the current approach trajectory from the SAC by correlating the current approach trajectory and the SAP;

if the deviation of the current approach trajectory from the SAC meets or exceeds a threshold deviation, calculating a required runway length (RRL) of the aircraft based on the predicted touchdown point;

if the RRL exceeds an available runway length (ARL) based on the predicted touchdown point, declaring an unstable approach path associated with the aircraft;

and if an unstable approach path is declared:

generating one or more course corrections configured for reconciling the current aircraft trajectory with the SAC;

and forwarding the one or more course corrections to the aircraft via at least one air traffic controller.

2. The ground-based system of claim 1, wherein, if the RRL exceeds the second length of the UTR, the at least one processor is configured for:

initiating a delay period;

and generating the one or more course corrections if, upon expiration of the delay period:

the deviation of the current approach trajectory from the SAC continues to meet or exceed the threshold deviation;

and the RRL continues to exceed the ARL.

3. The ground-based system of claim 2, wherein the at least one processor is configured to automatically generate the one or more course corrections without initiating the delay period if the aircraft is below a decision altitude.

4. The ground-based system of claim 1, wherein the at least one processor is configured for:

if the deviation of the current approach trajectory from the SAC meets or exceeds the threshold deviation and the RRL exceeds the ARL, forwarding a go-around recommendation to the aircraft via the at least one air traffic controller.

5. The ground-based system of claim 1, wherein:

the communications device is configured to receive at least two Automatic Dependent Surveillance-Broadcast (ADS-B) Out messages from the aircraft;

and the at least one processor is configured for determining, based on the at least two ADS-B Out messages, at least two positions of the aircraft, the current approach trajectory and the predicted touchdown point based on the at least two positions of the aircraft.

6. The ground-based system of claim 1, further comprising:

at least one runway sensor configured to sense current environmental data associated with the runway;

wherein the at least one processor is configured for calculating the required runway length (RRL) of the aircraft based on one or more of:

the current environmental data;

a predicted landing speed of the aircraft;

or a predicted braking deceleration of the aircraft.

7. The ground-based system of claim 6, wherein the environmental data comprises at least one of:

a runway friction status;

or a runway contamination status.

8. The ground-based system of claim 1, wherein the memory is configured for storing:

a first runway dataset corresponding to a first runway;

and at least one second runway dataset corresponding to a second runway.

9. The ground-based system of claim 1, wherein the memory is configured for storing:

a first runway dataset corresponding to a first orientation of a runway;

and a second runway dataset corresponding to a second orientation of the runway, the second orientation opposite the first orientation.

10. A method for ground-based monitoring and prevention of runway excursion, the method comprising:

storing, via a memory, at least one runway dataset corresponding to a runway, each runway dataset comprising:

a first length of a stable touchdown region (STR) of the runway and a second length of an unstable touchdown region (UTR) of the runway, the STR defined by a runway aiming point of the runway and bounded by forward and rear touchdown zone markings on either side of the runway aiming point, the UTR comprising that portion of the runway forward of the STR;

and a recommended glide slope trajectory associated with a stable approach path (SAP) to the runway aiming point;

defining a stable approach channel (SAC) corresponding to a landing within the STR, the SAC comprising a three-dimensional (3D) airspace associated with the SAP;

receiving at least one aircraft associated with an approach to a landing on the runway;

determining, based on at least two position reports received from the aircraft, a current approach trajectory of the aircraft and a predicted touchdown point on the runway;

determining a deviation of the current approach trajectory from the SAC by correlating the current approach trajectory and the SAP;

if the deviation of the current approach trajectory from the SAC meets or exceeds a threshold deviation, calculating a required runway length (RRL) of the aircraft based on the predicted touchdown point;

if the RRL exceeds an available runway length (ARL) based on the predicted touchdown point, declaring an unstable approach path corresponding to the aircraft;

and if an unstable approach path is declared:

generating one or more course corrections configured for reconciling the current aircraft trajectory with the SAC;

and forwarding the one or more course corrections to the aircraft via at least one air traffic controller.

11. The method of claim 10, wherein generating one or more course corrections configured for reconciling the current aircraft trajectory with the SAC includes:

initiating a delay period;

and generating the one or more course corrections if, upon expiration of the delay period:

the deviation of the current approach trajectory from the SAC continues to meet or exceed the threshold deviation;

and the RRL continues to exceed the ARL.

12. The method of claim 11, wherein generating one or more course corrections configured for reconciling the current aircraft trajectory with the SAC includes:

automatically generating the one or more course corrections without initiating the delay period if the aircraft is below a decision altitude.

13. The method of claim 10, further comprising:

forwarding a go-around recommendation to the aircraft via the at least one air traffic controller.

14. The method of claim 10, wherein determining, based on at least two position reports received from the aircraft, a current approach trajectory of the aircraft and a predicted touchdown point on the runway includes:

receiving at least two Automated Dependent Surveillance-Broadcast (ADS-B) messages transmitted by the aircraft, each ADS-B message comprising an identifier of the aircraft, a latitude of the aircraft, a longitude of the aircraft, and an altitude of the aircraft.

15. The method of claim 10, wherein calculating a required runway length (RRL) of the aircraft based on the predicted touchdown point includes:

receiving current environmental data associated with the runway;

and calculating a required runway length (RRL) of the aircraft based on one or more of:

a predicted landing speed of the aircraft;

a predicted braking deceleration of the aircraft;

or the current environmental data.

16. The method of claim 15, wherein the environmental data comprises at least one of:

a runway friction status;

or a runway contamination status.

* * * * *